UNITED STATES PATENT OFFICE 2,175,552

COPPER COMPLEX COMPOUNDS OF POLY-AZO DYESTUFFS OF THE STILBENE SERIES

Hans Schindhelm, Frankfort-on-the-Main-Fechenheim, and Carl Theo Schultis, Bergen, near Frankfort-on-the-Main, Germany, assignors to General Aniline Works, Inc., New York, N. Y., a corporation of Delaware No Drawing. Application April 15, 1938, Serial No. 202,290. In Germany April 16, 1937

4 Claims. (Cl. 260—146)

Our present invention relates to new copper complex compounds of polyazo dyestuffs of the stilbene series, more particularly to those of the general formula:

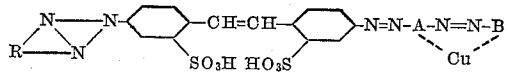

wherein R stands for a sulfonated radicle of the naphthalene series and A and B stand for sulfonated radicles of the naphthalene series which contain in o-position to the azo group a group capable of being metallized.

The aforesaid new copper complex compounds are obtained according to the present invention for instance by the following process of manufacture, 4-nitro-4'-aminostilbene-2.2'-disulfonic acid is diazotized and the diazo compound obtained is combined with an amine of the naphthalene series coupling in o-position to the amino group. The o-aminoazo dyestuff formed is converted into the corresponding triazole derivative by reacting the amino group with the azo group. Then the nitro group in the 4-position of the stilbene radicle is reduced to the amino group, the amino compound formed is diazotized and the diazo compound obtained is combined with a diazotable amine of the naphthalene series containing in o-position to the diazotable amino group a group capable of being metallized. The amino-monoazo dyestuff thus obtained is further diazotized and the diazo compound formed is combined with a compound of the naphthalene series containing in o-position to the coupling position a group capable of being metallized. The diazodyestuff thus obtained is then converted into its copper complex compound.

The single stages of the aforesaid process may also be performed in another sequence. Thus for example the formation of the triazole ring and the formation of the copper complex groups can be accomplished by a single simultaneous reaction.

Further on the synthesis of the polyazo dyestuffs may be performed in the following sequence: The diazo compound of 4-nitro-4'-aminostilbene-2.2'-disulfonic acid is combined with a diazotable amine of the naphthalene series containing in o-position to the amino group a group capable of being metallized. The aminoazo dyestuff formed is diazotized and the diazo compound obtained is combined with a compound of the naphthalene series containing in o-position to the coupling position a group capable of being metallized. Then the nitro group in the 4-position of the stilbene radicle is reduced and the diazo compound obtained is combined with an amine of the naphthalene series coupling in o-position to the amino group. Hereupon the formation of the triazole ring and of the copper complex groups is simultaneously performed.

The new copper complex compounds prepared according to the present invention are valuable dyestuffs for the dyeing of vegetable fibers, and the dyeings obtained are distinguished by good fastness properties, especially by an excellent fastness to light.

In order to further illustrate our invention the following examples are given, the parts being by weight.

Example 1

336 parts of 4-nitro-4'-aminostilbene-2.2'-disulfonic acid are diazotized in the usual manner and the diazo compound formed is combined with an aqueous solution of 230 parts of 1-aminonaphthalene-4-sulfonic acid in the presence of sodium carbonate. When the combination is complete, the dyestuff formed is filtered off and dissolved in about 5000 parts of boiling water. Then 350 parts of concentrated ammonia and the aqueous solution of 520 parts of crystallized copper sulfate are added, whereby the formation of the triazole compound occurs. The triazole compound formed is filtered off and converted into the corresponding amino compound by reducing the nitro group by means of iron and acetic acid in the usual manner.

584 parts of the amino-triazole thus obtained are diazotized and combined with an aqueous solution of 270 parts of 1-amino-2-ethoxy-naphthalene-6-sulfonic acid in the presence of sodium carbonate. The amino-azo dyestuff formed (which is called in the following examples "intermediate dyestuff") is freed from the excess of 1-amino-2-ethoxynaphthalene-6-sulfonic acid by dissolving it in water and reprecipitating it from this solution. Then it is further diazotized and combined with an aqueous solution of 340 parts of the sodium salt of 2-phenylamino-5-hydroxynaphthalene-7-sulfonic acid in the presence of pyridine. The diazo dyestuff formed is isolated, dissolved in water and reprecipitated from this solution. Hereupon the paste of the diazo dyestuff is dissolved in water, a little amount of acetic acid and the concentrated aqueous solutions of 820 parts of sodium acetate and of 300 parts of copper sulfate are added and the mixture is heated to boiling for about 8 hours. The copper complex compound of the dyestuff formed of the formula:

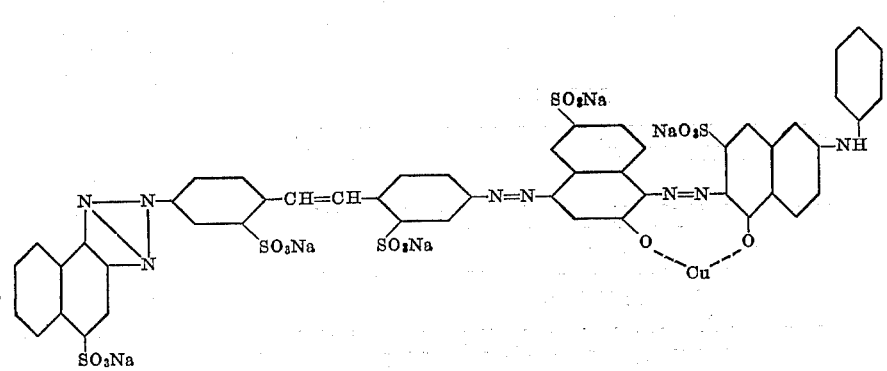

is purified by dissolving it in water and reprecipitating it from this solution. It is, when dry, a dark powder, soluble in concentrated sulfuric acid with a green color and in water with a bluish-green color, dyeing cotton deep green shades of very good fastness to light.

Example 2

The diazo compound of the "intermediate dyestuff" prepared according to Example 1 is slowly introduced at about 0° C. into an aqueous solution of 255 parts of 1-hydroxy-naphthalene-4-sulfonic acid containing about 10 percent by volume of pyridine. The disazo dyestuff formed is isolated and heated to boiling for about 8 hours in an aqueous solution of 300 parts of copper sulfate in the presence of sodium acetate. Then the copper complex compound formed of the formula:

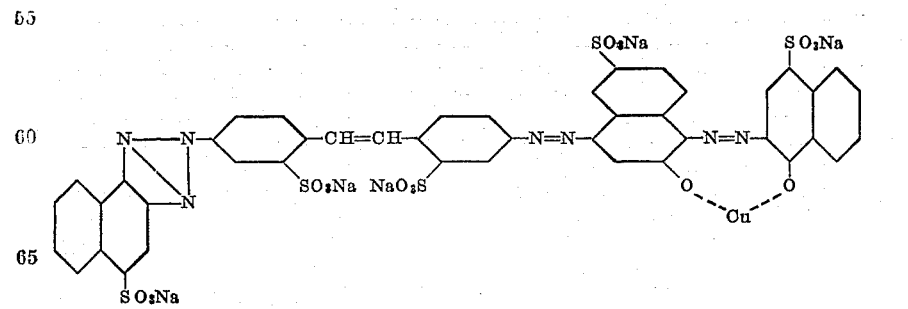

is filtered off, purified by dissolving it in a solution of sodium carbonate and reprecipitating it from this solution, filtered off again and dried. It is, when dry, a dark powder, soluble in concentrated sulfuric acid with a grayish-green color and in water with a green color, dyeing cotton deep shades of very good fastness to light.

Example 3

By employing in Example 1 as end component instead of 2 - phenylamino - 5 - hydroxynaphthalene-7-sulfonic acid the corresponding amount of 2 - benzoylamino -5- hydroxynaphthalene -7- sulfonic acid and acting further as described in Example 1, a copper complex compound of the formula:

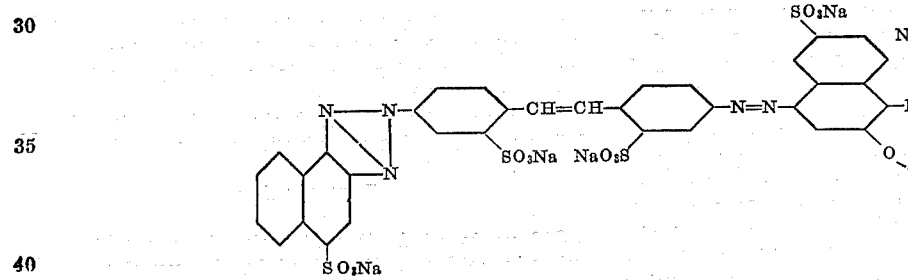

is obtained, which is, when dry, a dark powder, soluble in concentrated sulfuric acid with a green color and in water with a bluish-green color. It dyes cotton green shades of good fastness to light.

Example 4

The diazo compound prepared by starting from 336 parts of 4-nitro-4'-aminostilbene-2.2'-disulfonic acid is combined with 250 parts of the sodium salt of 2-aminonaphthalene-6-sulfonic acid. The dyestuff formed is purified and then it is converted into the corresponding nitrotriazole according to the directions of Example 1, and the nitrotriazole formed is reduced. The aminotriazole compound thus obtained is diazotized as described in Example 1 and the diazo compound formed is combined with 1-amino-2-ethoxynaphthalene-6-sulfonic acid. The aminoazo dyestuff formed is further diazotized and combined with 340 parts of the sodium salt of 2-phenylamino-5-hydroxynaphthalene-7-sulfonic acid in the presence of pyridine. The disazo dyestuff obtained is converted into the corresponding copper complex compound as described in Example 1. It corresponds to the formula:

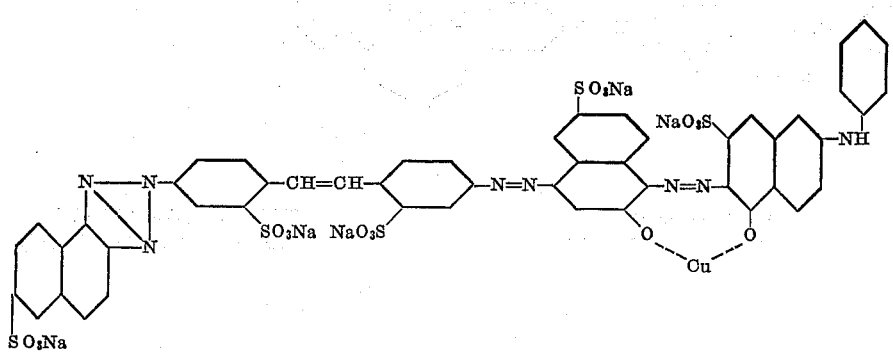

and is, when dry, a dark powder, soluble in concentrated sulfuric with a greenish-gray color and in water with a green color, dyeing cotton clear bluish-green shades of very good fastness to light.

We claim:

1. Copper complex compounds of polyazo dyestuffs of the stilbene series of the general formula:

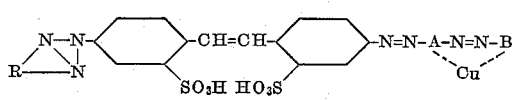

wherein R stands for a sulfonated radicle of the naphthalene series and A and B stand for sulfonated radicles of the naphthalene series containing in o-position to the diazo group a group capable of being metallized, which dyestuffs dye vegetable fibers green shades of good fastness properties, especially to light.

2. The copper complex compound of the formula:

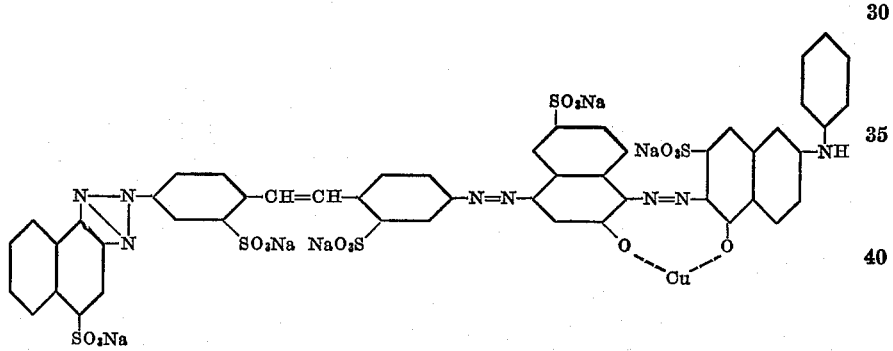

which is a dark powder, soluble in concentrated sulfuric acid with a green color and in water with a bluish-green color, dyeing cotton deep green shades of very good fastness to light.

3. The copper complex compound of the formula:

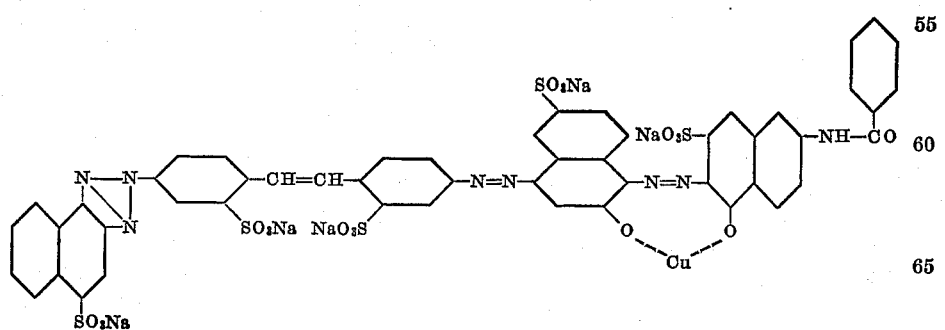

which is a dark powder, soluble in concentrated sulfuric acid with a green color and in water with a bluish-green color, dyeing cotton green shades of good fastness to light.

4. The copper complex compound of the formula:
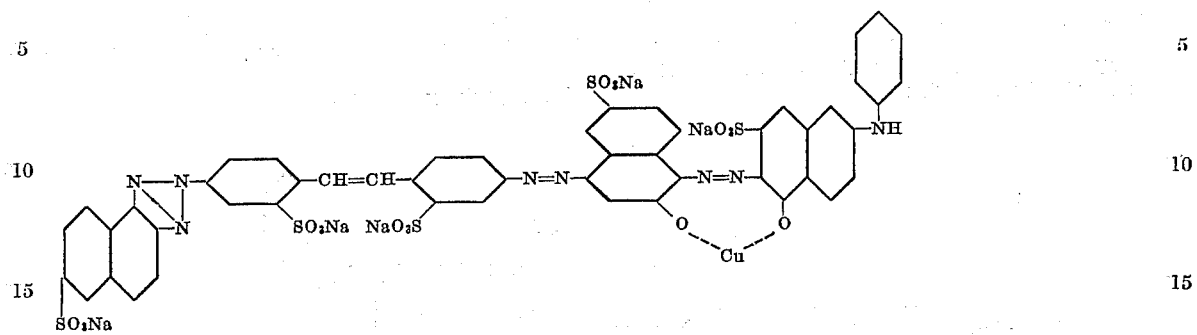
which is a dark powder, soluble in concentrated sulfuric acid with a greenish-gray color and in water with a green color, dyeing cotton clear bluish-green shades of very good fastness to light.
HANS SCHINDHELM.
CARL THEO SCHULTIS.